UNITED STATES PATENT OFFICE 2,498,301

TREATMENT OF DRILLING FLUIDS

Edward Samuel Self, Bakersfield, Calif., assignor to Oil Well Chemical & Materials Company, Los Angeles, Calif., a corporation of California No Drawing. Application April 7, 1948,
Serial No. 19,632

7 Claims. (Cl. 252—8.5)

This invention relates to the treatment of drilling fluids and particularly to the treatment of water base drilling fluids such as are employed in the rotary drilling of oil wells.

In drilling wells by the rotary method, it is necessary to circulate a drilling fluid in the bore hole to lubricate the drill bit, to carry the cuttings up to the surface, to hold down the formation pressures, and to form on the walls of the bore hole a sheath or cake which prevents the drilling fluid from escaping into the formation.

Drilling fluids of the water base type consist of a clay suspended in water to which weighting materials such as bentonite, galena, iron oxide, etc., are sometimes added to increase the specific gravity of the mud. The mud may be made from the natural clay which occurs at the location of the well or may be synthetically compounded from the clay and mud bases of commerce, including bentonite and beidellite.

In order to perform its function as has been above noted, the composition and condition of the drilling fluid must be rather closely controlled, and that is particularly true of its water loss to the formation and its viscosity; for if the water loss be too high, the filter cake on the wall builds up to such an extent that circulation of the mud fluid between the drill pipe and the walls of the hole is greatly impeded. Still further reasons for keeping the filter loss at the lowest possible level are to prevent caving of the walls of the bore hole and, to obtain the best possible result when cementing the casing, a thin mud cake is desirable. Still another reason for keeping water loss at a minimum is that when contacting the oil or gas sands, the escape of water from the drilling fluid into the oil or gas sand blocks the flow of oil or gas into the bore hole and thereby lessens production from the producing sands.

Referring to the importance of the control of viscosity of a drilling fluid as aforementioned, if the viscosity is too low, the cuttings will not be carried to the surface properly and freezing of the drill stem may take place; if the viscosity is too high, then the cuttings will not be properly deposited in the settling ditch or slush pit of the well, and moreover the drilling fluid column is likely to be "gas-cut"; that is, become permeated with gas from the formation being drilled. For practical purposes, the viscosity is usually maintained at between about 15 and 100 centipoises, depending on drilling conditions as measured on a Stormer viscosimeter.

A drilling fluid of low water loss and of proper viscosity may change appreciably as to both of these important characeristics during use. The drilling of the formation causes cuttings to enter the fluid and these cuttings may include salts or materials which increase the water loss of the drilling fluid and also increase its viscosity. The salts that seem to be particularly offensive in such regard are those of calcium and magnesium.

A still further source of contamination to the drilling fluid is that brought on by cementing a formation and a subsequent drilling operation through the cement.

A particularly destructive source of contamination destroying the desirable properties of drilling fluids, as has been mentioned in the foregoing, is gypsum.

One of the objects of this invention is to provide a drilling fluid and a treatment for a drilling fluid having the desired properties as has been outlined in the foregoing.

Another object is to provide a process for treating drilling fluids to increase the resistance of said drilling fluids to deterioration when drilling through beds of gypsum, which is understood to be a form of calcium sulphate.

A still further object of this invention is to provide an improved process for the treatment of drilling fluids with the chemical agents hereinafter set forth.

Further objects will appear from the description to follow, and it is understood that modifications thereof are included within the scope of the invention as set out in the appended claims.

One or more of the aforesaid objects may be accomplished by incorporating a small amount of sodium resinate and a sodium salt of carboxy methyl cellulose into a water base drilling fluid.

A source of sodium resinate useful in accordance with the process of this invention is the sodium salts of resinates prepared from the destructive distillation of pine tree stumps. Such materials are sold commercially as sodium resinates and are obtainable from chemical brokers.

The sodium carboxy methyl cellulose is likewise a product that is available commercially and for my purpose I prefer to use the materials that are marketed as low viscosity carboxy methyl cellulose. Other sodium salts of carboxy methyl cellulose are not excluded, but some of such materials will be found to impart too great a viscosity to the drilling fluid. Selecting a low viscosity carboxy methyl cellulose will be a simple matter for one skilled in the art. From commercial samples determinations may be made by the addition of the samples of a sodium carboxy methyl cellulose to various samples of drilling mud. The various samples of drilling mud containing the different samples of sodium carboxy methyl cellulose may be tested for viscosity increase with a Stormer viscosimeter or Marsh funnel. The sodium carboxy methyl cellulose samples having a minimum effect in increasing the viscosity of a drilling mud are particularly suitable.

In order to demonstrate the effectiveness of my [in]vention, a clay-water drilling fluid was pre[pa]red by adding 1.68 parts of Rogers Lake clay [to] 2 parts of water. This mixture produced a [dr]illing fluid of usable viscosity and having a [we]ight of approximately 84 lbs. per cu. ft. Such [a] drilling fluid is gelled to such a high viscosity [by] the addition of gypsum that said drilling fluid [is] no longer suitable for use. For example, I [too]k a core of gypsum obtained from a well in [th]e Round-Up Oil Field in Montana and filed [off] a sample of 1½ grams of powdered gypsum [(th]e 1½ grams in 500 c. c. is the equivalent of [1 l]b. of gypsum per barrel of drilling fluid in field [op]eration). On adding said gypsum to 500 c. c. [of] the Rogers Lake drilling fluid prepared as [ab]ove-mentioned from Rogers Lake clay, said [dr]illing fluid became so thick that it would not [be] suitable for use as a drilling fluid.

A second sample of drilling fluid was pre[p]ared by the addition of 15 grams of a com[me]rcial sodium resinate and 1½ grams of a low [vis]cosity sodium carboxy methyl cellulose. In [or]der to reduce foaming in the sample so treated, [a] small amount of mineral oil (25 c. c.) was added as an antifoamant. The viscosity of this [sa]mple was then measured by the conventional [St]ormer vi:cosimeter. The sample was then re[mo]ved from the Stormer viscosimeter and 1½ [gra]ms of gypsum from the core from the Round-[Up,] Montana well was added. This second [sa]mple was then agitated and the viscosity was [ag]ain measured, showing substantially no in[cre]ase in viscosity over the sample prior to the [ad]dition of gypsum. Inasmuch as 1½ grams in [50]0 c. c. is the equivalent of 1 lb. per barrel of [gy]psum in field practice, it will be apparent to [tho]se skilled in the art that my method provides [an] effective method of treating a drilling fluid [to] resist deterioration when gypsum beds are [en]countered during drilling operations.

Although the exact quantities of my treatment [wil]l vary with field conditions, in general from [5 t]o 20 lbs. per barrel of sodium resinate may [be] used in conjunction with ½ to 3 lbs. per bar[rel] of sodium carboxy methyl cellulose.

[I]t will be found desirable to incorporate about [5%] by volume of an antifoaming agent into the [wa]ter base drilling fluid being treated in ac[co]rdance with my invention.

The antifoaming agents that may be used com[pri]se any hydrocarbon base material such as al[coh]ols, benzene, pine oil, petroleum oils such as [cru]de oil, fuel oil, kerosene, and the like. The [mo]st suitable petroleum oils are those of high [gra]vity, preferably 30 or higher. It has been [fou]nd that such materials reduce the foaming [tha]t occurs due to the vigorous agitation of the [dri]lling mud.

[T]he actual quantities of an antifoaming agent [nee]ded will vary with the drilling fluid being [tre]ated and may be adjusted to suit the par[ticu]lar fluid treated by the drilling fluid engi[nee]rs. In practice, from about 5 to 20% by [vol]ume will be found adequate, but larger [am]ounts are not precluded.

[F]rom the foregoing it will be appreciated that [I h]ave provided a new and novel treatment for [pro]ducing a drilling fluid stable in the presence [of g]ypsum.

[W]hile my invention has been described, it is [my] intention that the description shall be taken [il]lustrative and that changes may be made in [the] process of said invention within the scope of [the] appended claims.

It is claimed:

1. The process of increasing the resistance of a drilling fluid to the deterioration caused by drilling through beds of gypsum comprising adding from ½ to 3 lbs. per barrel of sodium carboxyl methyl cellulose and from 5 to 20 lbs. per barrel of sodium resinate to said drilling fluid.

2. The process of increasing the resistance of a drilling fluid to the deterioration caused by drilling through beds of gypsum comprising adding from ½ to 3 lbs. per barrel of sodium carboxy methyl cellulose and from 5 to 20 lbs. per barrel of sodium resinate and a sufficient amount of an antifoaming agent to said drilling fluid to inhibit substantial foaming of the resulting drilling fluid.

3. The process of increasing the resistance of a drilling fluid to the deterioration caused by drilling through beds of gypsum comprising adding from ½ to 3 lbs. per barrel of sodium carboxy methyl cellulose, from 5 to 20 lbs. per barrel of sodium resinate, and about 5% of mineral oil as an antifoaming agent, to said drilling fluid.

4. The process of increasing the resistance of a drilling fluid to the deterioration caused by drilling through beds of gypsum comprising adding from ½ to 3 lbs. per barrel of a low viscosity sodium carboxy methyl cellulose and from 5 to 20 lbs. per barrel of sodium resinate to said drilling fluid.

5. As a new and useful composition of matter, a clay-water slurry having suitable characteristics for use in oil or gas well drilling to which has been added from about ½ to 3 lbs. per barrel of sodium carboxy methyl cellulose and 5 to 20 lbs. per barrel of sodium resinate and about 5% by volume of a mineral oil antifoaming agent.

6. The process of increasing the resistance of a clay-water drilling fluid for oil or gas wells to the contaminating effect produced by the introduction of gypsum into said drilling fluid, comprising pretreating said drilling fluid with about 1 pound per barrel of a low viscosity sodium carboxy methyl cellulose, about 15 lbs. per barrel of sodium resinate, and about 10% by volume of a high gravity crude oil, prior to drilling through gypsum or calcium sulphate formations.

7. As a new and useful composition of matter, a clay-water slurry having suitable characteristics for use as a drilling fluid in oil or gas well drilling to which has been added from about one-half to three pounds per barrel of sodium carboxy methyl cellulose and five to twenty pounds per barrel of sodium resinate and a sufficient amount of petroleum oil as an antifoaming agent to said resulting fluid to inhibit substantial foaming of said fluid when used as a circulating fluid in the drilling of oil or gas wells.

EDWARD SAMUEL SELF.

REFERENCES CITED

The following references are of record in the file of this patent:

UNITED STATES PATENTS

| Number | Name | Date |
|---|---|---|
| 1,833,772 | Bradshaw | Nov. 24, 1931 |
| 2,065,762 | Stanley | Dec. 29, 1936 |
| 2,169,369 | Osterloh et al. | Aug. 15, 1939 |
| 2,209,591 | Barnes | July 30, 1940 |
| 2,286,835 | Robinson et al. | June 16, 1942 |
| 2,425,768 | Wagner | Aug. 19, 1947 |
| 2,430,039 | Anderson | Nov. 4, 1947 |
| 2,468,657 | Dyke et al. | Apr. 26, 1949 |
| 2,468,658 | Dyke et al. | Apr. 26, 1949 |